June 24, 1958 — C. V. TILDEN — 2,840,348

DRILL BIT

Filed Nov. 22, 1954

INVENTOR.
CARL V. TILDEN
BY
ATTORNEY.

United States Patent Office 2,840,348
Patented June 24, 1958

2,840,348

DRILL BIT

Carl V. Tilden, Capistrano Beach, Calif.

Application November 22, 1954, Serial No. 470,321

8 Claims. (Cl. 255—69)

The present invention relates to drills in general and particularly to drill bits of the type adapted to be connected to an electric drill motor and rotated at a speed of several hundred R. P. M., or higher, and which are capable of drilling holes in extremely hard material such as concrete and rock. More specifically the invention comprises an improved rotary drill bit in which improved means are provided to feed the cuttings or core from the hole being drilled.

The advent of the rotary concrete cutting drill bit has lessened the manual labor involved in drilling holes in hard material such as concrete and has also greatly reduced the time required. Because of the abrasive characteristic of the material being drilled, tungsten carbide cutting elements are usually secured in the cutting end of the bit as by brazing or soldering. The great resistance to wear from abrasion of these cutting elements makes possible longer drill life and also faster cutting speed. As the drill advances into the hole it is drilling, the displaced material must be fed to the surface and to accomplish this the drill bit is conventionally provided with an encircling spiral thread or flute and the ground material is moved outwardly between the wall of the hole and the body of the drill by this flute. In the larger sizes, however, it has been found that a core-type drill is to be preferred in that with such drills it is unnecessary to grind up, at least to the same degree, the material in the center of the hole which material can instead pass outwardly through the drill body as a core. This core takes various forms, depending upon the material being ground. In extremely soft material it disintegrates and is fed outwardly through the bore of the drill and to an opening of openings in the spiral flute encircling the drill body. One of the preferred forms of drill so characterized is disclosed in the patent to Tilden, 2,579,712. Where the material is extremely dense and hard, however, as for example rock or concrete in which large rocks are present, the core may be fed outwardly in large pieces or chunks. If the discharge aperture or part of the bore is not sufficiently large these large core pieces cannot escape and will instead become wedged in the drill body. This requires that the drill bit be removed from the hole and the wedged core pieces or particles forced from the inlet as by means of a tool inserted through the discharge opening through which the particles could not escape. This requirement, of course, results in loss of drilling time and sometimes, and particularly if the escape holes are angularly related with respect to bore in the drill body or are not of the proper size, presents a problem in forcing the drilled core from the interior of the core barrel.

In the drill bit constructed in accordance with the present invention, the drill body is so constructed and arranged that the core formed of the material being drilled is fed directly through the bore and into the hole surrounding the drill body where it can be moved outwardly from the hole by the action of the spiral flute forming a part of the drill body. The discharge opening from the drill body, sometimes called the core barrel, to the exterior of the drill is of the same size and shape, within close limits, as the cross-sectional configuration of the bore itself with the result that no difficulty is encountered by the core pieces in making their escape. In the event solid core particles become wedged in the bore of the barrel making it necessary that the drill bit be removed from the hole in order to force these particles from the bore, the operation is simple in that the axis of the bore passes through the discharge port and a displacing force can be exerted upon the wedged particles in the direction they are to be moved. Additionally, in its preferred form the axis of the bore of the drill is inclined outwardly relative to the longitudinal major axis of the drill body from its inlet to its outlet. As the core particles are thrown radially outwardly by centrifugal force during drill rotation the slope of the outer wall of the bore directs them toward the outlet until finally they reach the outlet and are thrown outwardly and against the wall of the enclosing hole following which they are displaced longitudinally from the hole by the action of the spiral flute of the drill.

It is an object of the present invention to provide a new and improved drill bit in which the core of the material being drilled is less likely to become wedged in the drill.

Another object of the invention is to provide a new and improved core-type drill bit in which the straight major axis of the bore of the drill barrel through which the core particles pass intersects the side wall of the drill body at a point spaced from the cutting end of the bit.

Still another object of the invention is to provide a core-type drill bit in which the straight major axis of the bore of the drill barrel is inclined relative to the longitudinal axis of the drill.

A further object of the invention is to provide a rotary drill bit of the core type in which the straight major axis of the bore of the drill body is angularly inclined with respect to the axis of rotation, and its inlet at the cutting end of the drill is eccentrically positioned with respect to the axis of rotation.

Still another object of the invention is to provide a rotary core-type drill bit in which the bore of the drill is inclined relative to the axis of drill rotation and increases gradually in its cross-sectional area between its inlet and its outlet ends.

These and other more specific objects will appear upon reading the following specification and claims and upon considering in connection therewith the attached drawing to which they relate.

Referring now to the drawing in which a preferred embodiment of the invention is illustrated:

Figure 1:
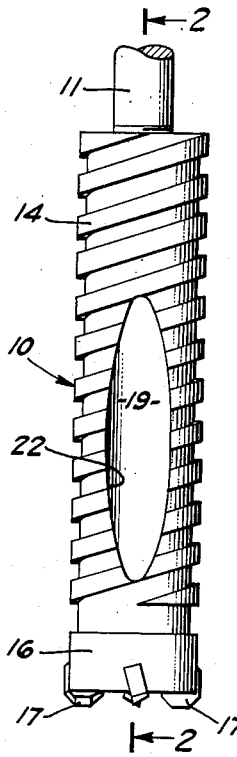
Figure 1 is a side view of a drill bit as constructed in accordance with the present invention, a portion of the shank which is conventional being broken away, and illustrating the discharge port formed at the intersection of the inclined bore in the drill body with the body side wall.

Referring again to the drawing and to Figures 1 and 2 in particular the first preferred embodiment of the invention is illustrated and is seen to comprise a drill body indicated generally by the reference character 10 to which connects a solid cylindrical shank 11 having any desired length and which is entirely conventional. In drills of the approximate size illustrated in the drawing, the shank 11 would have a length within the range of approximately seven to ten inches. The drill body or barrel 10 may be integral with the shank 11, or the two may be threadedly connected with the body provided with a recessed threaded seat 12 at its inner end. Drill body 10 is preferably cylindrical and formed of carbon steel with an encircling spiral flute or thread 14 upon its exterior which extends substantially to the head 16 and may even extend entirely to the cutting teeth in a conventional manner. Cutting elements 17, which may be of tungsten carbide or other abrasion-resistant cutting material, are mounted in the head end of the drill body and are secured in any suitable manner as by being welded, brazed or soldered in slots. A cylindrical straight internal bore 19 extends through the drill body 10 which otherwise is solid, with its axis inclinded with respect to the major or longitudinal axis of the drill. Bore 19 extends from its inlet opening 21 at the cutting end of the drill to its intersection with the side wall of the drill where it forms a discharge opening 22. Inlet opening 21 will be very slightly eliptical but almost round whereas discharge port or opening 22 is eliptical as clearly seen in Figure 1.

In a preferred arrangement the inner radial ends of the cutting elements or teeth 17 extend slightly into the inlet of the bore. The operation of the drill bit constructed in accordance with this first embodiment of the present invention is as follows. The shank 11 of the drill is chucked in a suitable electric drill motor and the cutting end of the drill bit, comprising the head end 16, is brought into contact with the surface to be drilled. The high speed rotation of the drill causes the cutting elements 17 to cut their way into the surface. The ground material passes outwardly in the hole at the side of the head 16 to become entrained in the spiral groove 14 and is lifted outwardly. The material at the center of the bottom of the hole and radially within the cutting teeth 17 passes upwardly into the bore 19 as the drill advances. This center portion of the hole forming what is known as a core, and depending upon the density and strength characteristics of the material, either disintegrates or forms a vertical column which extends farther and farther into the bore 19. Where the material is relatively soft the core gradually breaks up and is thrown by centrifugal force outwardly and against the side wall of the bore 19 by which it is directed, in the sense of being more or less cammed, toward the exhaust outlet 22. Upon reaching outlet 22 it escapes from the drill to join the material which is being passed longitudinally along the outside of the drill body in the spiral flutes 14. In the event the material is relatively solid and hard the core, instead of disentegrating may form a solid column which extends upwardly into the bore 19, the teeth 17, as they advance into the material, forming a circular channel therearound. This core will extend into the bore 19 for a distance and is finally broken off in a chunk which may be cylindrical and which may have a length of half an inch or more. This chunk is then thrown centrifugally outward by centrifugal action and because the bore 19 slopes outwardly is cammed, in effect, to the exhaust outlet 22 where it is brought into abrasive contact with the side wall of the hole being drilled. Here again the result depends upon the physical characteristics of the material and in certain instances the core will be disintegrated and will be passed outwardly by the spiral flutes 14 of the drill body. In other instances, however, the material forming the core may be sufficiently resistant to abrasion and to disintegration as to remain in solid form. In that event in time the bore 19 will become filled with aligned chunks of core ultimately resulting in inability of the drill to advance further into the material. When this occurs it is necessary that the drill be lifted from the hole and the core forced from the drill bore 19. This removal of core from the bore of the drill body is not at all unusual in the conventional drill but heretofore has frequently presented a problem in that the exhaust outlet is at the side of the bore and not in alignment with it and difficulty has been encountered in the exertion of the displacing force. In the drill constructed in accordance with the present invention, however, the displacing tool, which may be a steel rod or nail, can be placed against either end of the core, assuming the latter to be wedged in the bore 19, and a sharp force exerted as by striking the tool with a hammer. The wedged pieces are immediately displaced for there is no restriction in the bore to provide a binding action. Additionally, as the discharge port 22 offers no restriction to the core through being of reduced size the core can be displaced in either direction.

Figure 2:
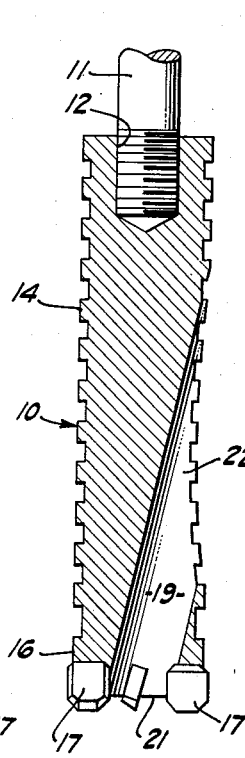
Figure 2 is a longitudinal section upon the line 2—2 of Figure 1.
Figure 3:
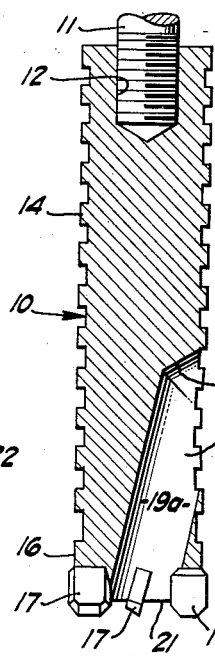
Figure 3 is a view of a second preferred form of the invention in which the longitudinal extent of the exhaust opening is decreased.

Referring now to Figure 3 in particular a second preferred embodiment of the invention is illustrated which is to be understood to be identical to the first form shown in Figures 1 and 2 with the exception of the bore, here indicated by the reference character 19a and the discharge port which bears the reference character 22a. The remaining parts of the drill bear the same identifying reference characters as in Figures 1 and 2. It is seen that discharge port 22a extends a lesser distance along the drill body and that the upper or outer end of the bore 19a is intercepted by the inclined shoulder or wall 23a which is inclined with respect to the major axis of the drill body 10 at an angle which is much greater than the major axis of the bore 19a. The latter axis, however, passes outwardly through the discharge port 22a and the outer portion of the wall of the bore leads directly and without interruption to that discharge opening so that centrifugally thrown particles are guided through as in the first embodiment. Shoulder 23a functions to cam outwardly particles or pieces of core within the bore 19a should they travel that far in the drill body. Core pieces in the bore 19a probably will usually not come into contact with shoulder 23a for the extension of such pieces radially outwardly from the drill would be excessive well before they traveled that far. In this form of the invention any wedged core pieces would have to be driven out through the inlet opening 21 whereas in the first embodiment of the invention the displacement could be in either direction. With the exception of this feature, however, the operation of this second preferred embodiment of the invention is substantially identical to that first described.

Figure 4:
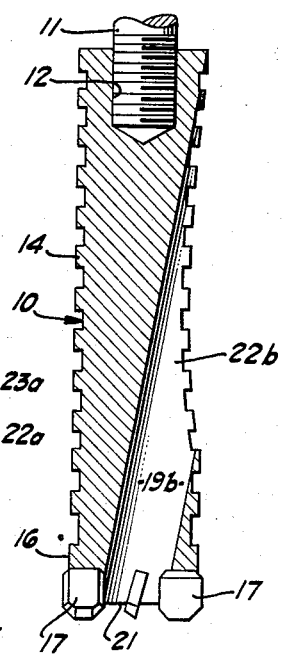
Figure 4 is a longitudinal cross-section through a third preferred form of the invention in which the inclination of the bore of the drill body relative to the longitudinal axis of the drill is less than in the embodiment of Figures 1 and 2.

Referring now to the third embodiment of the invention illustrated in Figure 4, that embodiment is identical in all respects to the first described embodiment of Figures 1 and 2 with the exception that the bore 19b has its axis inclined relative to the major axis of the drill body at a lesser angle than the angle of the axis of the bore 19. This provides a drill in which a longer length of solid core particles can collect before it is necessary to remove the drill from the hole for cleaning purposes. The outlet port 22b is also longer. In all other respects this form is identical in structure and operation to the first embodiment of the invention.

Figure 5:
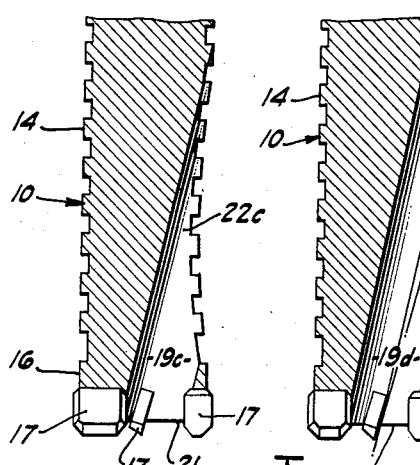
Figure 5 is a partial longitudinal section through a fourth embodiment of the invention in which the inclined bore in the drill body has its inlet opening eccentrically positioned with respect to the body.

Referring now to the fourth embodiment of the invention illustrated in Figure 5, this form is identical to the first form of the invention with the exception that the major axis of the inclined bore 19c is inclined at a greater angle from the longitudinal axis of the drill than is the major axis of the bore 19 and the axis of inlet opening 21 is offset to one side of the drill body axis as clearly shown in Figure 5. In operation this unit functions as does the first embodiment of the invention.

Figure 7:
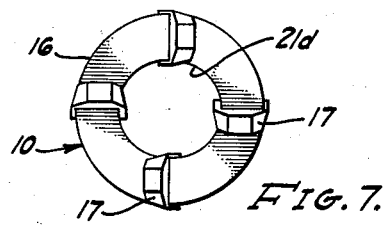
Figure 7 is an end view of the drill illustrated in Figure 6 looking in the direction of the arrows upon the line 7—7 in Figure 6.
Figure 6:
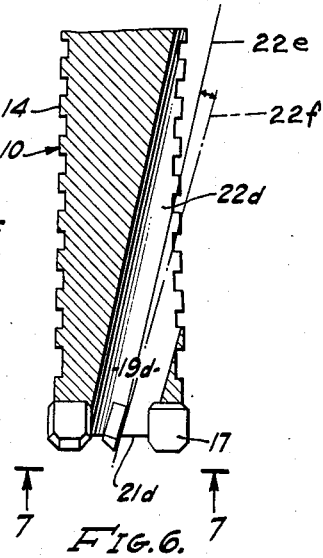
Figure 6 is a partial longitudinal section through a fifth preferred embodiment in which the cross-sectional area of the slanted bore in the drill body increases from its inlet to its outlet.

Referring now to Figures 6 and 7, a fifth preferred embodiment of the invention is illustrated which also is like the first described embodiment except as specified. In this form the bore, here indicated by 19d, is inclined or slanted with respect to the major axis of the drill but instead of being cylindrical has its cross-sectional area increased from its inlet 21d to its outlet 22d. Lines 22e, 22f show the divergence of the bore 19d. The operation of this fifth embodiment of the invention is similar to the previously described embodiments but is characterized by the advantage that as the bore 19d increases in cross-sectional area the likelihood of core pieces becoming wedged is greatly reduced, and should they become wedged the matter of displacement is made easier because of the obvious advantage in forcing wedged material through a passage of increasing size. The increase in size in the bore 19d is clearly illustrated by comparison of its diameter at spaced points as illustrated in Figure 7.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A drill for concrete and the like hard materials comprising a unitary one-piece cylindrical body, a spiral groove encircling said body, arcuately spaced cutting elements fixed to one end of said body extending inwardly from the periphery thereof toward the major axis of said body and ending short thereof, a straight bore extended through said body having an inlet opening adjacent said cutting elements, said bore being slanted with respect to the longitudinal major axis of said body to intersect the side wall thereof and to form an outlet opening intersecting said spiral groove a plurality of times.

2. The construction recited in claim 1 characterized in that certain of said cutting teeth extend a short distance into the inlet opening of said bore.

3. The construction recited in claim 1 characterized in that said bore expands in cross sectional area between its inlet and outlet ends.

4. A drill for concrete and the like as defined in claim 1 wherein the inlet end of said bore is radially offset from the longitudinal axis of said cylindrical body by a distance less than the radius of said bore.

5. A drill for concrete and the like comprising a unitary one-piece cylindrical main body having an annular radially flanged cutting head, a plurality of cutting teeth mounted in angularly spaced relation about said head and projecting radially and axially from the side and end surfaces thereof, a multiple-turn spiral chip conveying groove encircling said drill body from a point adjacent said head to the opposite end of the main body for conveying chips away from said head, a solid driving shank extending axially from one end of said drill, and a straight axis chip bore having an inlet end opening through the end of said cutting head and an outlet opening through the cylindrical side wall of said drill between the opposite ends thereof and intersecting said spiral groove a plurality of times.

6. A drill for concrete and the like as defined by claim 5 wherein the walls of said chip bore diverge toward the outlet end thereof to facilitate the passage of chips therealong.

7. A drill for concrete and the like as defined in claim 5 wherein the axis of the inlet end of said chip bore is radially offset from the axis of said main body and wherein said cutting teeth project radially into said bore inlet.

8. A drill for concrete and the like as defined in claim 7 wherein the diameter of said bore increases progressively from the inlet to the outlet end thereof.

References Cited in the file of this patent

UNITED STATES PATENTS

| 443,072 | Chapman | Dec. 16, 1890 |
| 1,867,024 | Oliver | July 12, 1932 |
| 2,506,474 | Tilden | May 2, 1950 |
| 2,567,084 | Stokes | Sept. 4, 1951 |
| 2,594,256 | Compton | Apr. 22, 1952 |

FOREIGN PATENTS

| 5,115 | Great Britain | Feb. 28, 1902 |
| 131,387 | Australia | Feb. 14, 1949 |
| 685,967 | Great Britain | Jan. 14, 1953 |
| 905,126 | Germany | Feb. 25, 1954 |